Patented Feb. 14, 1950

2,497,732

UNITED STATES PATENT OFFICE 2,497,732

HYDROXYPYRIDINES AND PROCESSES OF PREPARING THE SAME

Dorothea Heyl Hoffman, Rahway, N. J., assignor to Merck & Co., Inc., Rahway, N. J., a corporation of New Jersey No Drawing. Original application July 9, 1947, Serial No. 759,909. Divided and this application November 2, 1948, Serial No. 58,023

7 Claims. (Cl. 260—297)

This invention relates to novel chemical compounds and processes of preparing the same. More particularly, it is concerned with 2-methyl-3,4-dihydroxy-5-hydroxymethylpyridine and esters thereof.

This application is a division of my copending application Serial No. 759,909, filed July 9, 1947.

These novel chemical compounds possess vitamin $B_6$ activity and in small quantities give very deep colors varying from red to purple with ferric salts. These colored compounds may be used as inks, dyes or as a means of determining traces of ferric ion in solution. Colored chelates are also obtained with other metals, such as copper. These novel compounds are also capable of coupling with diazonium hydroxides from aniline, p-aminobenzoic acid, etc., to give red dyes.

The compounds forming the subject matter of the present invention may be represented graphically as follows:

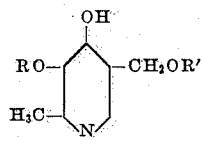

wherein R represents hydrogen and p-toluenesulfonyl group and R' represents hydrogen, phosphono, calcium phosphono and p-toluenesulfonyl substituents.

It has now been discovered in accordance with the present invention that compounds of the above formula wherein R and R' are hydrogen, fully defined by the chemical name 2-methyl-3,4-dihydroxy-5-hydroxymethylpyridine, can be prepared by reacting 2-methyl-3-hydroxy-4-formyl-5-hydroxymethylpyridine with hydrogen peroxide in an aqueous alkaline medium.

Various esters of 2-methyl-3,4-dihydroxy-5-hydroxymethylpyridine such as the phosphate of the 5-hydroxymethyl, and p-toluenesulfonate esters of the 3-hydroxy-5-hydroxymethyl groups have now been prepared. A process for preparing 2-methyl - 3,4 - dihydroxy - 5 - phosphonoxymethylpyridine involves reacting 2-methyl-3,4-dihydroxy-5-hydroxymethylpyridine successively with phosphorus oxyhalide and calcium carbonate in aqueous medium, recovering the calcium salt of 2-methyl-3,4-dihydroxy-5-phosphonoxymethylpyridine and reacting the latter compound with hydrochloric acid to form 2-methyl-3,4-dihydroxy-5-phosphonoxymethylpyridine.

An alternative method for preparing 2-methyl-3,4-dihydroxy-5-phosphonoxymethylpyridine involves reacting the calcium salt of 2-methyl-3-hydroxy-4-formyl-5-phosphonoxymethylpyridine with sodium hydroxide and hydrogen peroxide.

The 2-methyl-3,4-dihydroxy-5-hydroxymethylpyridine can be converted to the p-toluenesulfonyl ester by reacting 2-methyl-3,4-dihydroxy-5-hydroxymethylpyridine with p-toluene sulfonyl-chloride in a pyridine medium and recovering 2-methyl - 3 - p - toluene-sulfonoxy-4-hydroxy-5-hydroxymethylpyridine and 2-methyl-3-p-toluenesulfonoxy - 4 - hydroxy-5-p-toluenesulfonoxymethylpyridine by fractional crystallization.

This process can be represented graphically as follows:

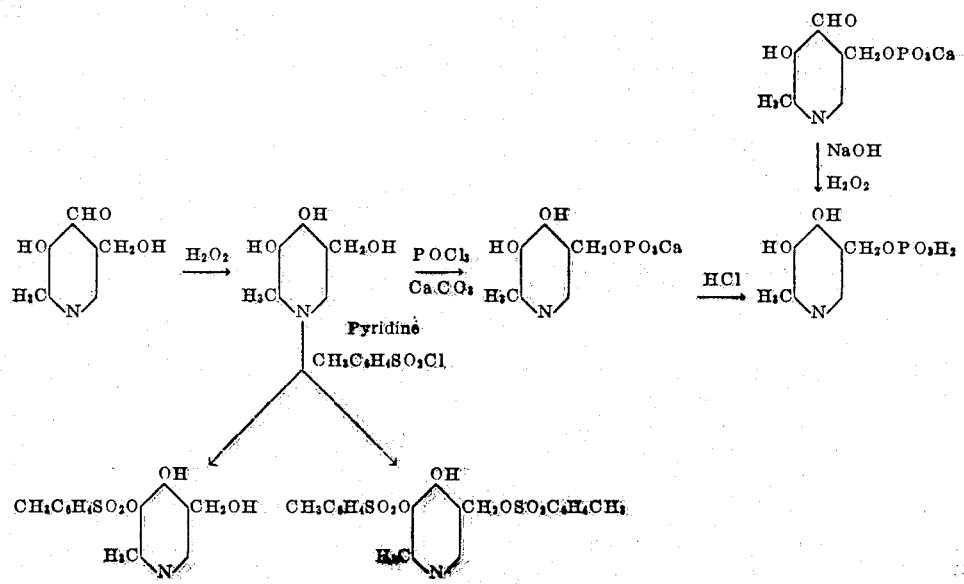

In carrying out the process of the present invention, 2-methyl-3-hydroxy-4-formyl-5-hydroxymethylpyridine hydrochloride is dissolved in water. The solution is cooled and adjusted to pH 10. The mixture containing the free base, 2-methyl-3-hydroxy-4-formyl-5-hydroxymethylpyridine is then reacted with hydrogen peroxide. The mixture is cooled, acidified and 2-methyl-3,4-dihydroxy-5-hydroxymethylpyridine crystals separate from solution.

These crystals are recovered and suspended in water. The aqueous solution is treated first with phosphorus oxychloride and later with calcium carbonate. The precipitate of the calcium salt of 2-methyl-3,4-dihydroxy-5-phosphonoxymethylpyridine is recovered. The calcium salt is suspended in water, the solution adjusted to pH 2, and 2-methyl-3,4-dihydroxy-5-phosphonoxymethylpyridine crystals separate from solution.

The alternative process for preparing 2-methyl-3,4-dihydroxy-5-phosphonoxymethylpyridine involves reacting 2-methyl-3-hydroxy-4-formyl-5-calcium phosphonoxymethylpyridine with sodium hydroxide and hydrogen peroxide.

The p-toluenesulfonyl esters can be prepared by reacting 2-methyl-3,4-dihydroxy-5-hydroxymethylpyridine with p-toluene sulfonylchloride in a pyridine medium. Cold water is added to the mixture which results in the formation of an oil. 2-methyl-3-p-toluenesulfonoxy-4-hydroxy-5-hydroxymethylpyridine crystallizes after ether has been added to the mixture. Cooling of the aqueous mother liquor results in the crystallization of 2-methyl-3-p-toluenesulfonoxy-4-hydroxy-5-p-toluenesulfonoxymethylpyridine.

The following examples illustrate a method of carrying out the present invention, but it is to be understood that these examples are given by way of illustration and not of limitation.

Example 1

5.0 g. of 2-methyl-3-hydroxy-4-formyl-5-hydroxymethylpyridine hydrochloride was dissolved in 15 cc. of water. The solution was cooled in an ice bath and sufficient 6 N sodium hydroxide was added to adjust the solution to pH 10. The bright yellow mixture thus formed was removed from the ice bath and hydrogen peroxide (30%) was added, several drops at a time. After about 5 cc. of the hydrogen peroxide had been added, the mixture became almost colorless. The mixture was then cooled in an ice bath and the solution acidified to pH 5 with hydrochloric acid. After further cooling, crystals of 2-methyl-3,4-dihydroxy-5-hydroxymethylpyridine separated from solution. The mixture was filtered and the crystals washed successively with water, alcohol and ether. The crystals had a melting point of 225.5–226.5° C. with decomposition. Two recrystallizations from water did not change the melting point. This material gave a purple color with ferric chloride solution.

Analysis calculated for $C_7H_9NO_3$: C, 54.16; H, 5.85; N, 9.03. Found: C, 54.40; H, 5.94; N, 8.97.

Example 2

Fifteen cubic centimeters of phosphorus oxychloride was added dropwise with mechanical stirring to 2.7 g. of 2-methyl-3,4-dihydroxy-5-hydroxymethylpyridine suspended in 21 cc. of water. The rate of addition was regulated so that the temperature of the mixture did not rise above 50° C. After an additional half hour of stirring and removal of excess hydrogen chloride under reduced pressure, the mixture was surrounded by a water bath at 5° C. A suspension of calcium carbonate in water was added until the color turned pink, carbon dioxide was no longer evolved, and the solution was pH 5. After an hour of chilling, the precipitate was removed by filtration and washed with ice water. The aqueous solution, totaling 150 cc., was diluted with three volumes of alcohol. After 2 hours of cooling, the pink precipitate of the calcium salt of 2-methyl-3,4-dihydroxy-5-phosphonoxymethylpyridine was centrifuged and washed twice with alcohol and once with ether.

The calcium salt described above was suspended in water, cooled in ice, and sufficient 6 N hydrochloric acid was added to adjust the solution to pH 2. The crystals of free 2-methyl-3,4-dihydroxy-5-phosphonoxymethylpyridine were filtered and washed successively with water, alcohol and ether. These crystals had a melting point of 229° C. which was not depressed when the material was mixed with a sample prepared by oxidation of codecarboxylase (2-methyl-3-hydroxy-4-formyl-5-phosphonoxymethylpyridine).

Example 3

A saturated oxalic acid solution was added dropwise with thorough stirring to 100 mg. of the calcium salt of 2-methyl-3-hydroxy-4-formyl-5-phosphonoxymethylpyridine (estimated by assay to be about 80% pure) until the yellow solid had all disappeared. The white precipitate of calcium oxalate was removed by centrifuging and washed twice with water. The combined solution and washings were chilled in an ice bath and made alkaline (pH 10) by the dropwise addition of sodium hydroxide solution. Several drops of hydrogen peroxide (30%) was added, also dropwise, and the solution warmed to room temperature. The color change from bright yellow to a very pale yellow required about ten minutes. After removal of some calcium hydroxide by centrifuging, the solution, chilled in ice, was acidified (pH 2) with N hydrochloric acid. The 2-methyl-3,4-dihydroxy-5-phosphonoxymethylpyridine crystallized promptly from solution. The crystals were removed and washed successively with ice water, alcohol and ether. The crystals had a melting point of 229–230° C. with decomposition and gave a purple color with ferric chloride solution.

Analysis calculated for $C_7H_{10}NO_6P$: C, 35.73; H, 4.29; N, 5.96; P, 13.19. Found, C, 35.55; H, 4.63; N, 5.73; P. 13.00.

Example 4

To a suspension of 300 mg. of 2-methyl-3,4-dihydroxy-5-hydroxymethylpyridine (prepared as described in Example 1) in 2.5 cc. of pyridine cooled in an ice bath, 924 mg. of p-toluene sulfonylchloride was added in several portions. The solution became clear. After 5 minutes standing at room temperature, the mixture was added to an excess of ice water. An oil came out, which crystallized after ether had been added to the mixture. The mixture was cooled, filtered, and well washed successively with water, alcohol and ether. The crude 2-methyl-3-p-toluenesulfonoxy-4-hydroxy-5-hydroxymethylpyridine was recrystallized 3 times from alcohol, the final product melting at 228–229° C. with decomposition.

Analysis calculated for $C_{14}H_{15}NO_5S$: C, 54.36; H, 4.89; N, 4.53. Found: C, 54.66; H, 5.09; N, 4.70.

The ether was sucked off the filtrate from which the crude material in the above preparation had been separated, and the aqueous solution was diluted with water and cooled in an ice bath. The resulting crystals of 2-methyl-3-p-toluenesulfonoxy - 4 - hydroxy - 5 - p -toluenesulfonoxymethylpyridine were filtered and washed successively with water, alcohol and ether. After 2 recrystallizations from alcohol, the melting point of the crystals was constant at 140.0–141.5° C.

Analysis calculated for $C_{21}H_{21}NO_7S_2$: C, 54.41; H, 4.59; N, 3.02; S, 13.83. Found: C, 54.53; H, 4.27; N, 3.25; S, 13.71.

Modifications may be made in carrying out the present invention without departing from the spirit and scope thereof and the invention is to be limited only by the appended claims.

I claim:

1. The process that comprises reacting 2-methyl-3-hydroxy-4-formyl -5 - hydroxymethylpyridine with hydrogen peroxide in an aqueous alkaline medium, recovering the 2-methyl-3,4-dihydroxy - 5 - hydroxymethylpyridine thus formed, reacting the latter compound with phosphorus oxyhalide and calcium carbonate in aqueous medium, recovering the calcium salt of 2-methyl - 3,4 - dihydroxy-5-phosphonoxymethylpyridine, reacting the latter compound with hydrochloric acid and recovering the 2-methyl-3,4-dihydroxy - 5 - phosphonoxymethylpyridine thus formed.

2. The process that comprises reacting 2-methyl - 3-hydroxy-4-formyl-5-hydroxymethylpyridine with hydrogen peroxide in an aqueous alkaline medium, acidifying the latter mixture, recovering the 2 - methyl-3,4-dihydroxy-5-hydroxymethylpyridine thus formed, reacting the latter crystals with phosphorus oxychloride and calcium carbonate in an aqueous medium, recovering the calcium salt of 2-methyl-3,4-dihydroxy - 5-phosphonoxymethylpyridine, reacting the latter compound with hydrochloric acid and recovering 2-methyl-3,4-dihydroxy - 5 - phosphonoxymethylpyridine.

3. The process that comprises reacting 2-methyl - 3-hydroxy-4-formyl-5-hydroxymethylpyridine with hydrogen peroxide in an aqueous alkaline medium and recovering the 2-methyl-3,4 - dihydroxy - 5 - hydroxymethylpyridine thus formed.

4. The process that comprises reacting 2-methyl - 3,4 - dihydroxy - 5 - hydroxymethylpyridine with phosphorus oxyhalide and calcium carbonate in aqueous solution and recovering the calcium salt of 2-methyl-3,4-dihydroxy-5-phosphonoxymethylpyridine thus formed.

5. The process that comprises reacting the calcium salt of 2-methyl-3,4-dihydroxy-5-phosphonoxymethylpyridine with hydrochloric acid and recovering the 2-methyl-3,4-dihydroxy-5-phosphonoxymethylpyridine thus formed.

6. 2 - methyl - 3,4 - dihydroxy-5-hydroxymethylpyridine.

7. Calcium salt of 2-methyl-3,4-dihydroxy-5-phosphonoxymethylpyridine.

DOROTHEA HEYL HOFFMAN.

No references cited.